United States Patent
Cederwall et al.

(10) Patent No.: US 7,663,628 B2
(45) Date of Patent: Feb. 16, 2010

(54) APPARATUS AND METHOD FOR EFFICIENT ANIMATION OF BELIEVABLE SPEAKING 3D CHARACTERS IN REAL TIME

(75) Inventors: Chris Cederwall, Los Angeles, CA (US); Todd Griffith, Chelmsford, MA (US); Hillel Rom, Belt Zait (IL)

(73) Assignee: Gizmoz Israel 2002 Ltd., Ramat-Gan (IL)

( * ) Notice: Subject to any disclaimer, the term of this patent is extended or adjusted under 35 U.S.C. 154(b) by 321 days.

(21) Appl. No.: 10/235,822

(22) Filed: Sep. 6, 2002

(65) Prior Publication Data
US 2003/0137515 A1     Jul. 24, 2003

Related U.S. Application Data
(60) Provisional application No. 60/349,350, filed on Jan. 22, 2002.

(51) Int. Cl.
*G06T 15/00*     (2006.01)
(52) U.S. Cl. ............... 345/473; 345/474; 345/475
(58) Field of Classification Search ........... 345/473, 345/474, 475
See application file for complete search history.

(56) References Cited

U.S. PATENT DOCUMENTS

| | | | |
|---|---|---|---|
| 6,285,380 B1 | 9/2001 | Perlin et al. | |
| 6,369,821 B2 | 4/2002 | Merrill et al. | |
| 6,522,333 B1 | 2/2003 | Hatlelid et al. | |
| 7,006,098 B2 * | 2/2006 | Bickmore et al. | 345/474 |
| 7,027,054 B1 * | 4/2006 | Cheiky et al. | 345/473 |
| 7,095,413 B2 * | 8/2006 | Shibao | 345/473 |
| 7,253,817 B1 * | 8/2007 | Plantec et al. | 345/473 |

FOREIGN PATENT DOCUMENTS
WO    WO 03/063079    7/2003

OTHER PUBLICATIONS
Parke et al. Computer Facial Animation, p. 135-137, 1996.
* cited by examiner

*Primary Examiner*—Phu K Nguyen

(57) ABSTRACT

An apparatus for animating a moving and speaking enhanced-believability, character in real time, comprising a plurality of behavior generators, each for defining a respective aspect of facial behavior, a unifying scripter, associated with the behavior generators, the scripter operable to combine the behaviors into a unified animation script, and a renderer, associated with the unifying scripter, the renderer operable to render the character in accordance with the script, thereby to enhance believability of the character.

18 Claims, 7 Drawing Sheets

APPARATUS AND METHOD FOR EFFICIENT ANIMATION OF BELIEVABLE SPEAKING 3D CHARACTERS IN REAL TIME

REFERENCE TO RELATED APPLICATIONS

The present invention claims priority from U.S. Provisional Patent Application No. 60/349,350 filed Jan. 21, 2002, the contents of which are hereby incorporated by reference.

FIELD AND BACKGROUND OF THE INVENTION

The present invention relates to an apparatus and method for efficient animating of a believable speaking character, preferably but not exclusively a 3-D character, in substantially real time.

The large volume of electronic textual information and other forms of readable communications have begun to spawn methods of delivering messages with more impact and believability. Without a doubt, human facial images combined with speech provide a compelling way of delivering messages. Video messages with or without sound are one example of delivering more believable messages. However, video messages are typically limited to a given subject chosen to be imaged in advance. In many cases, it may not be appropriate or desirable to shown a specific, "real" person to deliver a message. Effort has been made in recent years to develop animated figures that can effectively and flexibly deliver believable messages. However, animating figures and images of human faces and integrating them with human voices to flexibly create believable messages is not a trivial task. Some examples of prior art, the contents of which are hereby incorporated by reference, follow.

U.S. Pat. No. 6,097,381 deals with video images and the creation of a database of spoken phonemes associated with images. The database can subsequently be used to synthesize believable animations of humans speaking. Synthesizing speech or facial movements to match selected speech sequences, to simulate animated image of human speaking is disclosed.

U.S. Pat. No. 5,657,426 discloses synchronizing facial expressions with synthetic speech. Text input is transformed into a string of phonemes and timing data, which are transmitted to an image generation unit. At the same time, a string of synthetic speech samples is transmitted to an audio server. Synchronization between the image generation unit and the audio server produces facial configurations which are displayed on a video device, along with the audio speech.

U.S. Pat. No. 6,052,132 discloses a technique for providing a computer generated face having coordinated eye and head movement by providing a computer generated movable head and at least one computer generated movable eye. The movement of the movable head and the movable eye are coordinated such that the movement of the movable head follows the movement of the movable eye. The prior art thus addresses some elements of the image-speech interface, however, realism is lacking wherever real time output is required. That is to say the prior art produces realistic images only when animation of the character is carried out off line, and the subtleties of realism are not possible to provide in real time facial-head animation. In much of the prior art, output video images have been concatenated from fixed input video, leaving a less than desirable effect from a standpoint of believability.

Psychologically speaking, the human eye is very attuned to small and subtle nuances in facial and head movement and expression, making believability much harder to achieve in facial-head animation than in animation of any other part of the body. Consequently, it is impossible to ignore subtleties, and numerous variables must be dealt with. The need to deal with numerous variables, inherent in creating a believable facial image having speech characteristics, has been a barrier to providing such facial animation in a real time setting.

SUMMARY OF THE INVENTION

The present embodiments provide a novel combination of the fields of 3-D animation, digital puppetry, behavioral character animation, text-to-speech, and real time phoneme recognition.

In particular, the preferred embodiments provide an animated interactive character which speaks and behaves in a natural, which is to say believable, manner and interacts with a user in real time.

According to a first aspect of the present invention there is thus provided an apparatus for animating a moving and speaking enhanced-believability character in real time, comprising:

a plurality of behavior generators each for defining a respective aspect of facial behavior;

a unifying scripter, associated with said behavior generators, said scripter operable to combine said behaviors into a unified animation script; and a renderer, associated with said unifying scripter, said renderer operable to render said character in accordance with said script, thereby to enhance believability of said character.

Preferably, said behavior generator is operable substantially off line.

Preferably, said behavior generator is operable to generate said behavior over a defined time.

Preferably, said behavior is maintainable in an active behavior pool in accordance with said defined time.

Preferably, said behavior comprises a set of behavior elements.

Preferably, said behavior elements comprise at least one chosen from a list comprising: geometric; orientation; and appearance elements.

Preferably, said behavior elements are operable upon a plurality of polygonal surfaces comprising a visual appearance of said character.

Preferably, one of said behavior generators is a facial speech behavior generator operable to generate facial expressions for said character based upon character speech.

Preferably, said character speech is at least one chosen from a list comprising a text source and an audio signal.

Preferably, said character speech is transformable by a phoneme recognizer, said phoneme recognizer producing pairs of respective phonemes and phoneme weights.

Preferably, said phoneme weights effect a relative emphasis of respective phonemes based upon at least one phoneme attribute.

Preferably, said phoneme attribute is chosen from a list comprising: amplitude, pitch, and emphasis.

Preferably, text from said text source is convertible into a speech audio signal using a text to speech converter.

Preferably, said audio signal is forwarded to an audio device for synchronized playback with facial speech behavior of said character.

Preferably, one of said behavior generators is an eye gaze direction behavior generator operable to determine eye gaze direction on an animation frame-by-frame basis.

Preferably, inputs for said eye gaze direction behavior generator comprise: a primary gaze default direction, probabilities for eye movement, and a maximum time for resetting gaze to said primary default direction.

Preferably, said eye gaze direction behavior generator further comprises a primary thresholder operable upon elapsed time since last gaze change versus said maximum time, indicating a gaze change to said primary gaze default direction if elapsed time exceeds said maximum time or indicating no gaze change if said maximum time is not exceeded.

Preferably, said eye gaze direction behavior generator further comprises a secondary random thresholder operable in association with said primary thresholder, whereby a random threshold is generated based on said probabilities for eye movement and whereby elapsed time since said last gaze change against said random threshold is compared, said secondary random thresholder thresholding a gaze change by a specific amount in a random direction if elapsed time exceeds said random threshold or no gaze change if said random threshold is not exceeded.

The apparatus may further comprise a saccade accumulator to simulate a gaze saccade operable in association with said amount of gaze change, said accumulator accumulating said amount of gaze change with an accumulated gaze change amount.

The apparatus may further comprise a saccade thresholder operable upon said accumulated gaze change amount to determine an actual eye movement equal to said accumulated gaze change amount and to subsequently reset said accumulated gaze change amount to zero when a saccade threshold value is exceeded, and to determine an actual eye movement equal to zero when said saccade threshold value is not exceeded.

Preferably, said saccade threshold value is operable upon a maximum up-down and a maximum left-right actual eye movement.

Preferably, said maximum up-down and said maximum left-right actual eye movement values are 3 degrees and 7 degrees, respectively.

Preferably, a mood and a personality of said character are useable to set said probabilities.

Preferably, one of said behavior generators is an eye blink behavior generator, operable to effect eye blink behavior.

Preferably, inputs for eye blink behavior generator comprise: an inherent blink rate probability, determinable in association with a personality of said character, speech behavior, from which a speech-related blink probability is generatable; mood, from which a mood-related blink probability is generatable; and eye movement, from which an eye movement related blink probability is generatable.

Preferably, said eye blink behavior generator further comprises a summer, operable to sum respectively generated blink probabilities to yield a summed blink probability larger than zero and smaller than one.

Preferably, said eye blink behavior generator further comprises a thresholder, operable in association with said summer, to indicate an occurrence of a blink.

Preferably, said thresholder comprises:

a random number generator wherein a random number larger than zero and smaller than one is generated;

a random thresholder for comparing said summed blink probability against said random number; a blink being indicated if said summed blink probability is larger than said random number, and no blink being indicated if said summed blink probability is smaller than said random number; and an elapsed time thresholder operable in association with said random thresholder indicating a blink status, so that elapsed time since a last blink is compared against a blink threshold time, said elapsed time thresholder indicating a blink if said elapsed time is larger than said blink threshold, or no blink indicated if elapsed time is smaller than said blink threshold.

Preferably, one of said behavior generators is a mood behavior generator comprised of:

inputs chosen from a list comprising: direct user input, text analysis, and audio analysis;

a mood selector for using said inputs in the selection of a mood; and a behavior element producer for generation of at least one behavior element for defining behavior in accordance with said selected mood.

Preferably, said direct user input is effectible by means of a graphical input device wherein a plurality of mood selectors are arrayed on a circumference of a circular dial with an adjustable radial hand, said adjustable radial hand being user operable to indicate at least one mood selector and a respective relative mood intensity.

Preferably, said adjustable radial hand is user pointable to a desired mood selector.

Preferably, said adjustable radial hand is user pointable between two adjacent mood selectors, thereby indicating a relative combination of both moods, based on the relative positioning of said adjustable radial hand between said two adjacent moods.

Preferably, the length of said adjustable radial hand is indicative of said relative mood intensity.

Preferably, one of said behavior generators is a head orientation behavior generator operable to effect head orientation behavior on an animation frame-by-frame basis.

Preferably, said head orientation generator is operable to select from user input and other behavior generator output to use in said effecting of head orientation behavior.

Preferably, said head orientation is chosen from a list comprising head turn, nod, and tilt.

Preferably, said unifying scripter is operable to order said behaviors according to respective behavior elements and respective defined times, thereby creating said unified animation script.

Preferably, a behavior weighter is operable to weigh respective behavior elements using respective weights, to vary respective behavior element influence upon said character.

Preferably, said respective weight is defined as:
Weight=$V_0+f((T-T_0)/D)*(V_1-V_0)$ where:

$T$=a current time;

$T_0$=start time, relative to other behavior elements in said set of behavior elements;

$D$=time duration of said behavior element;

$V_1$=weight value when said function evaluates to 1;

$V_0$=weight value when the function evaluates to 0; and $f$ is a function returning a value ranging from 1 to 0.

Preferably, said function is chosen from a list of functions comprising: trigonometric, wedge, and linear.

Preferably, said geometric behavior element comprises changes of position of a plurality of vertices of said polygonal surfaces.

Preferably, said orientation behavior element comprises changes to said character resulting from transformations to vertices of said polygonal surfaces.

Preferably, said transformations comprise a rigid transformation applied to a plurality of vertices of said polygonal surfaces of at least one part of said character.

Preferably, said transformations comprise tapered transformations operable upon a plurality of points of said character in accordance with respective stickiness factors.

Preferably, respective stickiness factors are defined as: $s_v=1-k_v$ where:

$s_v$ is said stickiness factor for a rotation of a given vertex within a body of vertices; and $k_v$ is an angular coefficient for said vertex, $k_v$ further being defined in: $\theta_{v,\alpha}=k_v\alpha$ where:

$\alpha$ is a rotation of said body of vertices; and $\theta_{v,\alpha}$ is a resultant rotation at said vertex.

The apparatus may further comprise a graphics library rotation mechanism to effect a sticky rotation, resembling a standard rigid rotation, said mechanism comprising:

a sorter for sorting said vertices according to respective $s_v$ values;

a rotation definer for defining a local rotation, based upon said rotation angle $\alpha$ around an axis W, using library commands;

a rotation matrix computer, in association with said sorter and said rotation definer, operable to compute a rigid rotation matrix with angle $-s_v\alpha$ for said vertices when $s_v$ is not equal to zero.

a vertex multiplier, in association with said thresholder, for multiplying respective vertices with a non-zero $s_v$ value by said rigid rotation matrix, thereby yielding a negative rotation over said angle $\alpha$.

Preferably, said appearance behavior element comprises at least one appearance aspect chosen from a list comprised of: color; texture; and lighting.

Preferably, a material is associated with a respective appearance aspect.

According to a second aspect of the present invention there is provided a method for animating a moving and speaking enhanced-believability character in real time, comprising the steps of:

defining respective aspects of facial behavior in order to generate respective facial behaviors;

unifying said behaviors into a unified animation script; and rendering said character in accordance with said script, thereby to enhance believability of said character.

Preferably, said generation of respective behaviors is performed substantially off line.

Preferably, said generation of respective behaviors is for a respective defined time.

Preferably, said generation of respective behaviors includes generation of facial speech behavior, whereby facial expressions for said character are generated, based upon character speech, comprising the steps of:

using a text source or audio signal as said character speech; and transforming said character speech into phonemes.

Preferably, text from said text source is converted into a speech audio signal.

Preferably, said audio signal is forwarded for synchronized playback with said facial speech behavior.

Preferably, said generation of respective behaviors includes generation of eye gaze direction behavior to determine eye gaze direction on an animation frame-by-frame basis, comprises the steps of:

thresholding elapsed time since last gaze change versus an inputted maximum time;

indicating a gaze change to an inputted primary gaze default direction if elapsed time exceeds said maximum time; or, if no gaze change is indicated:

thresholding elapsed time since last gaze change versus a randomly generated threshold value, based upon probabilities for eye movement;

indicating no gaze change if said maximum time is not exceeded; and indicating a gaze change by a small amount in a random direction if said maximum time is exceeded.

The method may further comprise the steps of:

summing said gaze change amount to an accumulated gaze change value;

thresholding said accumulated gaze change thereby simulating a gaze saccade effect, so that an actual gaze change is set equal to said accumulated gaze change and said accumulated gaze change is subsequently set to zero if said accumulated gaze change exceeds a saccade threshold value; and setting an actual gaze change to zero if said accumulated gaze change does not exceed said saccade threshold value.

Preferably, said saccade threshold is definable for an up-down and a left-right direction gaze change.

Preferably, a mood and a personality of said character are used to set said probabilities.

Preferably, said generation of respective behaviors includes generation of eye blink behavior comprising the steps of:

generating a plurality of blink probabilities;

summing said blink probabilities to yield a value between zero and one;

thresholding said summed blink probability against a randomly generated number between zero and one;

indicating a blink if said summed blink probability is larger than said number; or, if no blink is indicated;

thresholding an elapsed time since last blink against a blink threshold time;

indicating a blink if said elapsed time is larger than said blink threshold time.

Preferably, said generation of respective behaviors includes generation of mood behavior comprising using inputs to select said a mood and said mood intensity.

Preferably, said generation of respective behaviors includes generation of head orientation behavior on an animation frame-by-frame basis, comprising selecting from user input and other behavior generation to effect head orientation behavior.

BRIEF DESCRIPTION OF THE DRAWINGS

For a better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DESCRIPTION OF THE PREFERRED EMBODIMENTS

Figure 1:
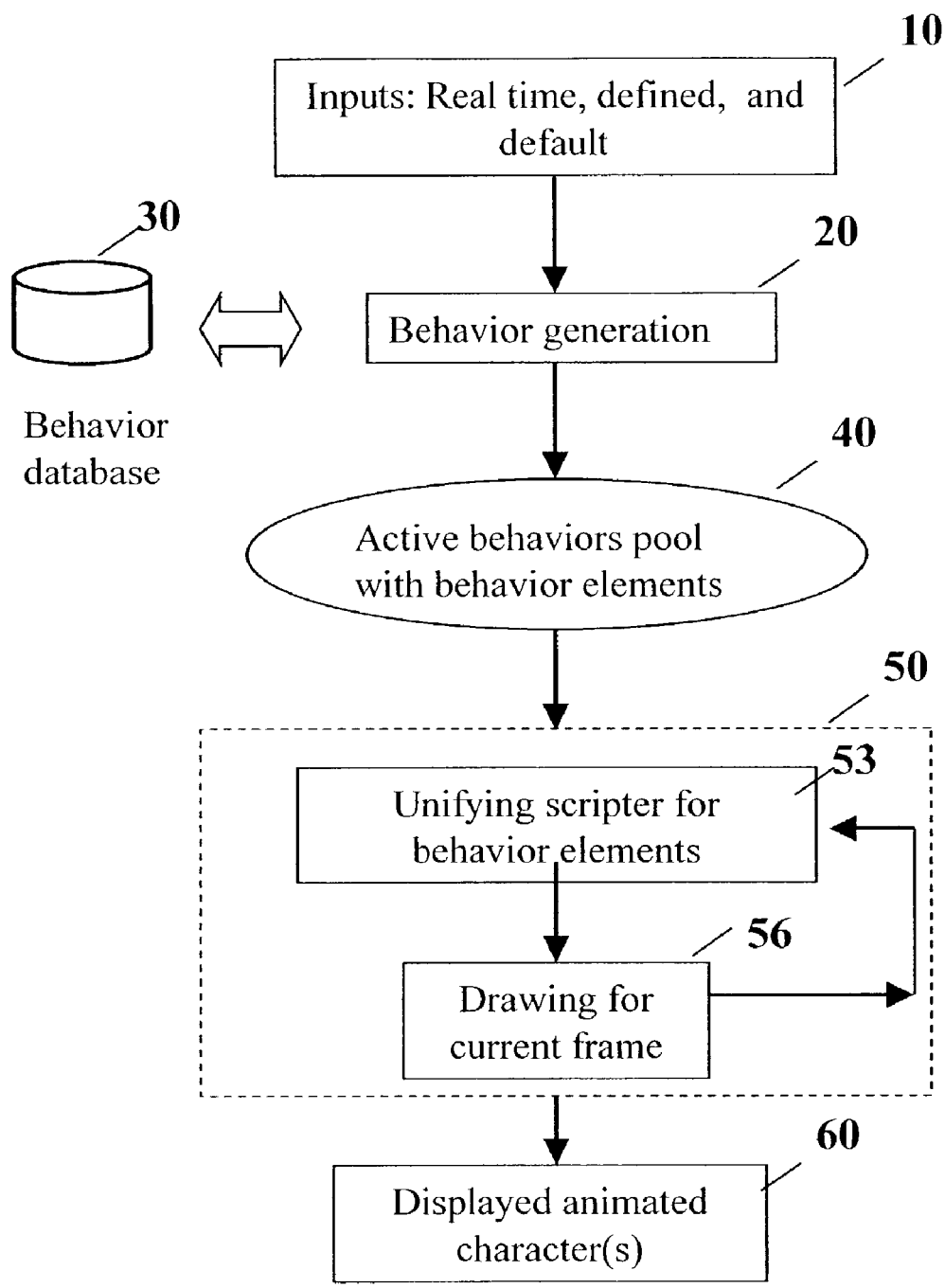
FIG. 1 is a simplified block diagram indicating the salient elements of a character animation system, in accordance with a first preferred embodiment of the present invention.

The present embodiments of the system display an animated character, designed to speak and behave in a substantially natural manner. A system maintains a model of the character, which is rendered to a display every drawing cycle, i.e. every frame. The current state of the model, including geometry, orientation, and appearance are determined by events which are either internal to the system or are input from external sources.

The embodiments provide an array in which the subtleties of believable face, head, eye, and mouth movements are generated separately and subsequently combined, using weightings.

Before explaining the embodiments of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The present embodiments preferably utilize characters developed with relatively low complexity, hence the ability to animate them in real time. Using various techniques from the computerized game industry, the characters have a rich appearance, on par with characters in typical animated feature films. The developed characters are enhanced with behavior and personality mechanisms, as will be described in detail below, giving them believable life-like characteristics.

In animating a character with synchronized speech playback, sounds included in the speech are used amongst other possibilities to determine visible face-head movements. The speech sounds used may be selected to be non-language dependent so that a preferred embodiment is inherently multilingual, and animation may be generated for a variety of languages. As an alternative to speech playback, the system may generate speech from text using synthetic speech technology, also known as Text to Speech (TTS). When using TTS, a combination of behavioral animation, speech technology, and text processing may be used to turn plain text and emoticons :-) into believable character animation, as will be explained in greater detail below.

In addition to real-time interaction, preferred embodiments may be used to generate animated messages to be sent to Internet users through e-mail, to mobile users via cellular networks, and through Instant Messaging programs. The ability for users to directly manipulate a character's movements, speech, and expressions creates an experience which is equally entertaining for the sender and receiver.

Reference is now made to FIG. 1 which is a simplified block diagram outlining the salient elements of a character animation system, in accordance with a first preferred embodiment of the present invention. The system accepts inputs 10, which may be in the form of real time (dynamic), defined (static), or default inputs. Behavior generation 20 uses inputs 10 and stored behavior generators from a behavior database 30 to generate character behaviors. Generated behaviors, composed of behavior elements, are passed onto an active behaviors pool 40, where generated behavior and respective behavior elements are available for dynamic integration into the character. Behavior elements are described in more detail below. Character animation 50 is performed in real time, on a frame-by-frame basis, using behaviors developed in an asynchronous, non real-time mode, available in the active behaviors pool 40. Character animation 50 comprises a unifying scripter for behavior elements 53, wherein behavior elements of the different behaviors are unified in a sequential manner to give a sequential script which can then be used to generate the frame-by-frame presentation of the character. Character animation 50 also comprises drawing for the current frame 56, wherein the script for the current frame is transformed into a drawn character and, if applicable, background. The sequence of frame-by-frame scripting in the unifying scripter for behavior elements 53 and drawing for current frame 56 recurses until all of the animation frames are processed. The output of character animation 50 is displayed animated character(s) 60, as viewed by the user. Note that the current embodiment allows for more than one animated character to be displayed.

It should be reemphasized that although some inputs 10 may be in real time, behavior generation 20 and maintenance of behaviors in the active pool 40 are typically not performed in real time. As opposed to this, character animation 50 and its constituent steps, as well as displayed animated character(s) 60 are essentially performed in real time. As previously noted, behavior generation 20 is comprised of a number of behavior generators, to be further described. Additional elements and details of the character animation system are discussed below.

Figure 2:
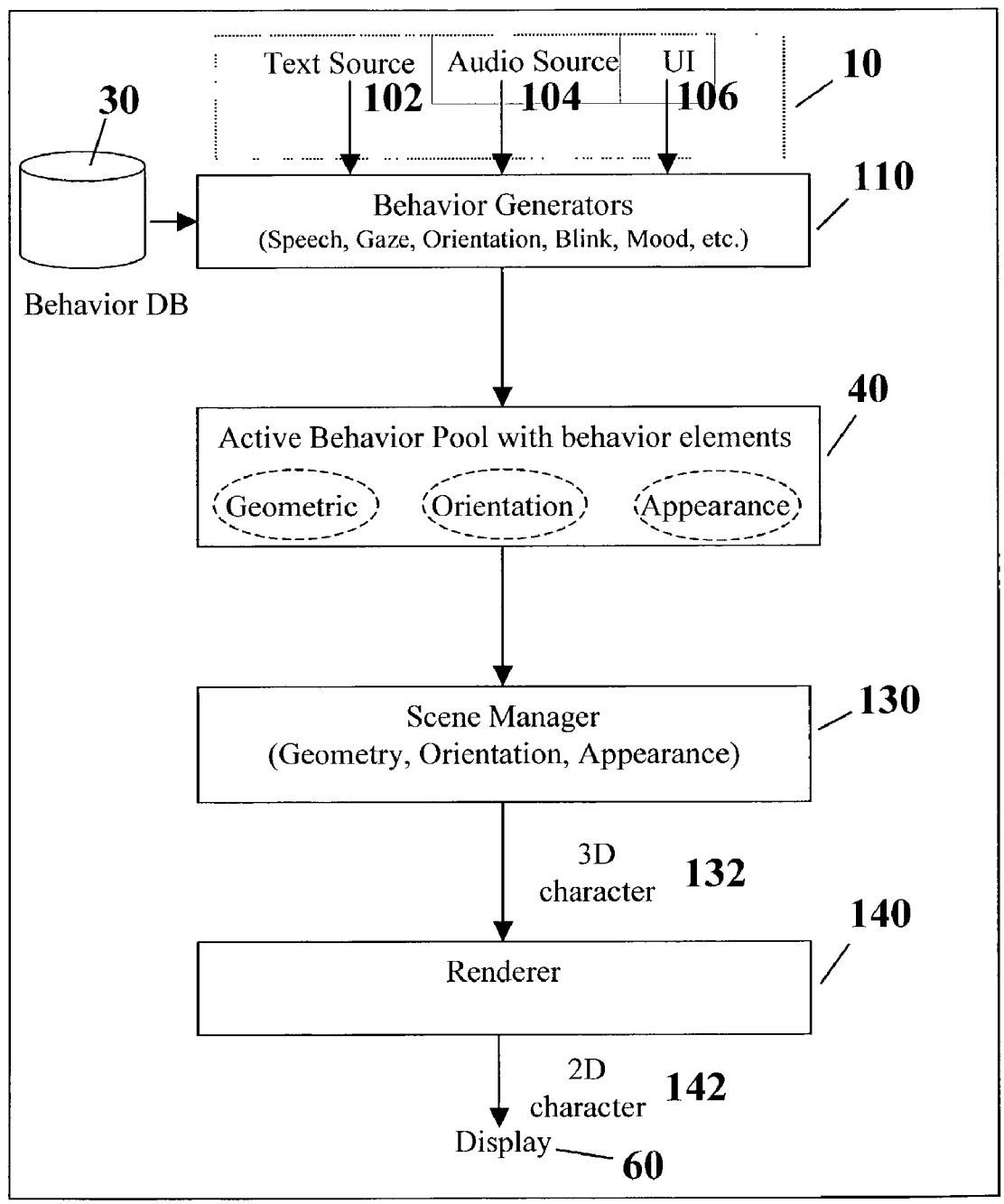
FIG. 2 is a simplified block diagram outlining the general components of a character animation system, as shown in FIG. 1.

Reference is now made to FIG. 2 which is a simplified block diagram further outlining components of a character animation system, as previously shown in FIG. 1. The system accepts inputs 10, which, in addition to the forms previously noted in FIG. 1, are divided into three types: text 102, audio 104, and user interface inputs 106 (controls from the user). The behavior database 30 may provide previously developed behavior generators 110 to act upon the input, as will be explained in more detail below, to produce behaviors for the character. Behavior generators 110, such as some of the generators noted in the present figure, generate behaviors which are stored in the active behavior pool 40. The generated behaviors remain in the pool as long as they are still required for scripting. As previously noted in FIG. 1, behaviors are comprised of behavior elements, which are indicated in the present figure as geometric, orientation, and appearance in the active behavior pool 40. More details about these three behavior elements are discussed below. Every drawing cycle (ie every animation frame) a scene manager 130, which takes behaviors from the active behavior pool 40, acts to order respective behavior elements coinciding with the current frame, and a 3D character 132 is developed. Note that the unifying scripter 53 previously noted in FIG. 1 is a part of the scene manager 130 in the present figure. A renderer 140 takes the 3D character 132 and, on a frame-by-frame basis, transforms it into a drawn 2D character 142, which is shown on the display 60.

Text 102 input may be any text source, either keyboarded directly by the user or obtained from a file stored locally or from a remote source. Audio 104 input containing speech may be either from a live audio source (e.g. using a microphone) or from a pre-recorded audio file (e.g. an MP3 file), or from an audio stream from a source over the Internet. Text 102 and audio 104 inputs are processed in behavior generators 110 (specifically, in a speech behavior generator further described below) to modify and synchronize character facial and mouth animation with character speech (i.e. audio). The user may control various aspects of character animation (such as gaze, mood, and orientation) via the user interface 106, as explained further below.

Behavior Elements

A behavior comprises a series of visual changes of the character over time. Examples of behavior are shown in behavior generators 110. Visually appearing changes in every behavior may include the character's geometry (vertex positions of character polygons comprising the surface appearance of a character—described below), the character's orientation, or its appearance (color or texture). These specific changes are called behavior elements. Three behavior elements: geometric, orientation, and appearance are indicated in the active behavior pool 40 in the present figure.

One example of a behavior generator is a speechmaking animation generator. The speaking animation generator analyzes an audio signal for each spoken phoneme and produces an appropriate behavior, for example a facial expression or mouth movement corresponding to a respective phoneme. Speech behavior is composed of the three above mentioned behavior elements (geometry, orientation, and appearance) varying over time.

As previously noted, behavior generators 110 typically do not operate in real-time. However, the scene manager 130 and subsequent renderer 140 provide for real time character generation, in 3D and in displayable 2D form, respectively. Behaviors are maintained in the active behavior pool 40 as long as behaviors are active, meaning as long as they have a bearing on animation of frames by the scene manager 130 and renderer 140. An example of this is blink behavior, in which an individual blink remains active for a preset duration only.

Figure 3:
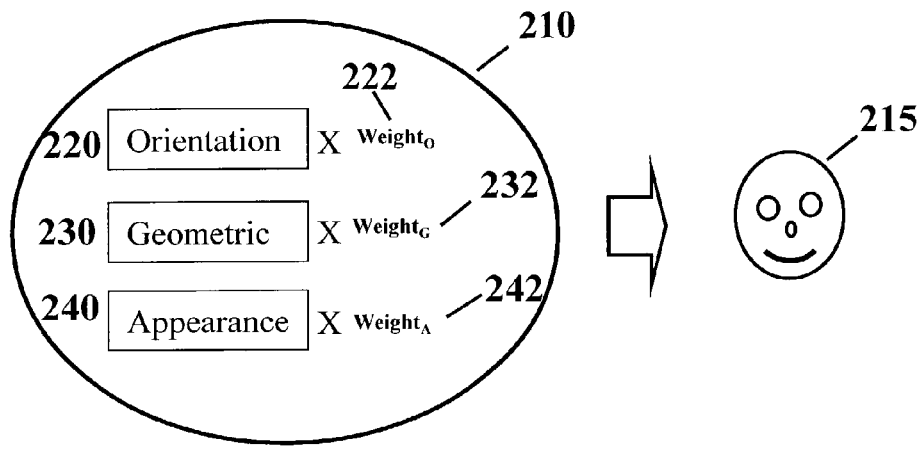
FIG. 3 is a simplified block diagram illustrating behaviors and their relationship to a character.

Reference is now made to FIG. 3, which is a simplified block diagram illustrating behavior elements and their relationship to a character. A behavior 210 is defined as a series of timed changes on the character 215. (Note that more than one behavior 210 typically operates on the character.) Each behavior 210 is further comprised of a number of behavior elements, represented in the current figure by orientation 220, as geometric 230, and appearance 240 behavior elements, each of which is further described below. Although the following discussion is limited to the practical application of three behavior elements, there essentially is no limit to the number of behavior elements.

Each behavior element has a corresponding weight, calculated by a weight function. The corresponding weights are respectively designated weight$_O$ 222, weight$_G$ 232, and weight$_A$ 242. The weight function describes a change over time of a specific weight affecting each behavior element in the given behavior, as described further below. The time noted above may also be interpreted as a duration of a given behavior element, which is to say the amount of time that the behavior element is intended to be valid.

The orientation 220 behavior element changes the orientation of the character 215 by applying a transformation to its vertices. The term "vertex" as used herein means the corners defining the polygons used in standard 3D animation techniques to make up a visual appearance of the character. A character's polygonal meshes and textures are preferably created within standard third party applications such as Maya, SoftImage, 3D Studio Max, or Mirai. Vertex transformations may be a rigid transformation applied to all vertices of a part of the character 215 (e.g. rotate the eyes), or a tapered transformation where the transformation affects each point according to a specified "stickiness factor", meaning a factor which enables transformation of vertices in a non-uniform manner. (Details about stickiness factor are discussed further below.) An example of a tapered transformation may be the rotation of the head around the neck—the points on the top of the head move freely whereas the points along the neck move less the closer they are to the stationary shoulders.

The geometric 230 behavior element changes (i.e. morphs) the position of all or part of the vertices of character 215. Changes such as these are performed through the process of morphing, i.e. interpolation between a base position and a target position over time. An example may be changing a mouth position from a neutral position to a smile.

The appearance 240 behavior element changes aspects affecting the visual appearance of the faces of a polygon of character 215. Visual appearances may include color, texture, lighting, etc. A specific example may be changing eye color from blue to green.

Weight Function

As defined above, a behavior 210 effects changes of a character 215 over time. A weight computation for each behavior element in a given behavior 210 is performed every drawing cycle (ie every frame), returning a weight which factors the specific behavior element in the scene manager 130 (as noted in FIG. 1), directly effecting the character 120. In this way, a given behavior, which may yield a change over a number of frames, is expressed as its constituent behavior elements which are respectively weighted to enable naturally appearing changes over a number of frames.

Given a time T between $T_0$ and $T_0+D$, the weight computation is performed as follows $$\text{Weight}=V_0+f((T-T_0)/D)*(V_1-V_0)$$

where the following terms are defined:

$T_0$=start time, relative timing to the other behavior elements in the behavior; (behavior elements may be serially enabled one after another, with or without overlaps)

D=duration of the behavior element, meaning the time during which a behavior element acts.

$f$=function defining weight changes over time; (this may be any function returning a value between 0 and 1, such as cosine between 0 and 90 degrees, sine between 0 and 90 degrees, wedge, linear, constant, etc.) and is a function of the proportional part of the time duration of the behavior element.

$V_0$=weight value when the function evaluates to 0;

$V_1$=weight value when the function evaluates to 1.

Behavior Generators

As noted previously in FIG. 2, behaviors are generated by a set of behavior generators. Behavior generators generate behaviors for one or more characters based on various events, which may be either external events, such as system inputs, or internal events, such as those derived from one or more behavior generators.

Possible behavior generators preferably include: a speaking animation generator, responsible for visual appearance of a talking character; a gaze generator, responsible for a direction in which the character is looking; a blink generator, responsible for blinking behavior; a head orientation generator, responsible for a current position of the character head and head movement; and a mood generator, responsible for the character's mood, such as happy, mad or sad. Each of the respective behavior generators is further described below.

Speaking Animation Generator

Figure 4:
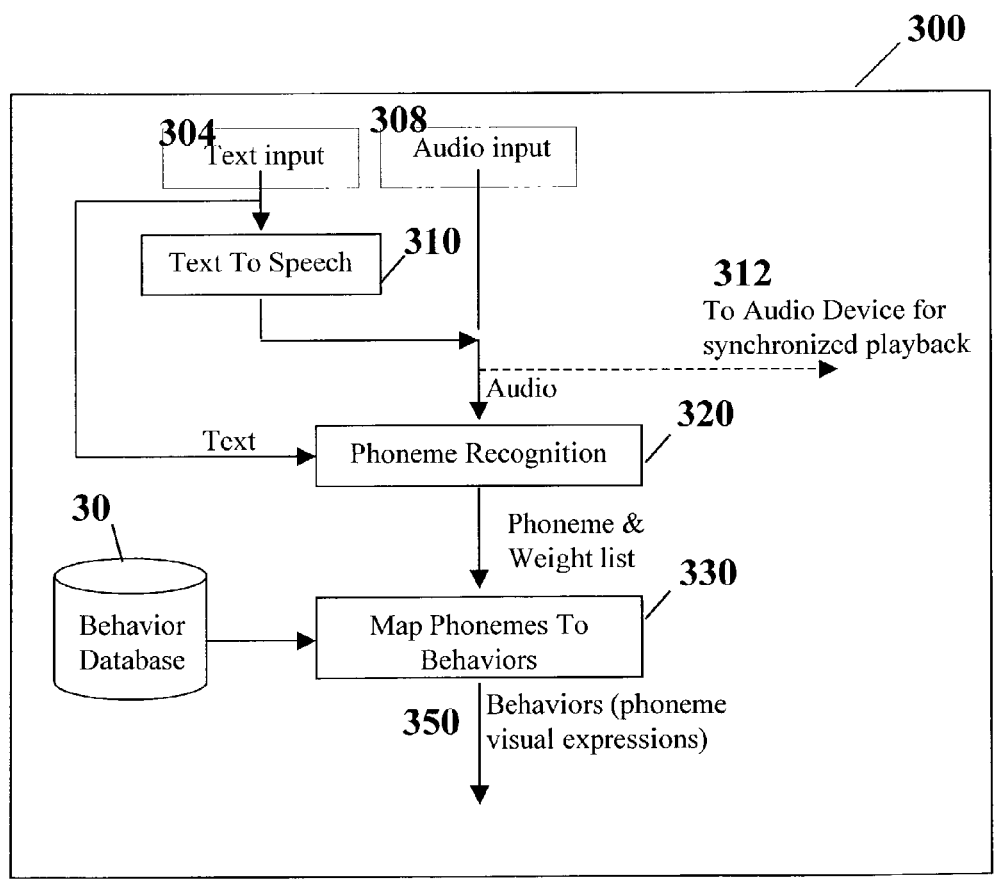
FIG. 4 is a simplified flowchart of a speech generation process in accordance with a second preferred embodiment of the present invention.

Reference is now made to FIG. 4 which is a simplified flowchart of a speaking animation generation process in accordance with a second embodiment of the present invention. A speaking animation generation process 300 comprises generating a character's talking visual appearance, synchronized with audio played on an audio device. The speaking animation generation process 300 may have one or two inputs: a text input 304, and an audio input 308. Both of these inputs are fed to a phoneme recognition 320. In the case of a text input 304, text is either inputted to a text-to-speech generation 310 or the text is fed directly to phoneme recognition 320 When text is inputted to a text-to-speech generation 310, the output is then audio which is fed to phoneme recognition 320. Note that the audio signal is also fed to an audio device for playback 312, synchronized with speech animation. Phoneme recognition 320 transforms character speech, as input in either audio or textual form, into one or more appearance behaviors. The output from phoneme recognition 320 is a set of phonemes with associated weights, and these are fed to a map phonemes to behaviors module 330, where the weighted phonemes are mapped to corresponding behaviors. It is noted that the mapping is not necessarily one-to-one. For example a phoneme based on "m" is preferably mapped to the same pursing of the lips behavior as a "b" based phoneme. Weights, noted above, reflect a relative emphasis of each phoneme and weights are discussed in more detail below. Mapping is performed to active behaviors as well as to behaviors from the behavior database 30. Output in the form of behaviors, yielding (in this case) visual appearance of the character synchronized with audio playback, are placed in the active behaviors pool 350.

As can be seen in the present figure, the core of the speech generation process 300 is phoneme recognition 320. A commercially available module for use in phoneme recognition 320 is InstantSync by AST. Phoneme recognition 320 includes analysis of audio input 308 containing speech and produces a list of phonemes (sounds which make up the spoken language) present in a speech segment, in addition to relative timing of phonemes and other relevant attributes, such as amplitude and pitch. In parallel, a list of weights is generated, with one respective weight per phoneme, reflecting the relative emphasis of each phoneme, taking into account other relevant attributes noted above.

In the case of text input 304, text may be converted into an audio signal using a text to speech engine (e.g. Microsoft SAPI or Lucent text to speech). As previously noted, the audio input 308 (in this case, possibly comprised of converted text in the form of speech) is then analyzed by phoneme recognition 320.

Output from map phonemes to behaviors 330 is one or more behaviors comprising visual expressions 350 corresponding to a current phoneme. For example, the 'oo' phoneme would be mapped to a behavior which would include a facial expression with a puckered lip formation.

Roughly forty different sound phonemes make up the English language and less than sixty phonemes are sufficient to cover all spoken languages throughout the world. However, for the purpose of speech animation, not all phonemes need to be recognized. Only a subset of the phonemes, those with distinct facial expressions also known as visemes, need to be recognized, thus reducing the burden for phoneme recognition 320. The number of visemes used and the exact mapping of phonemes to visemes depends on the quality of animation desired and is left to the discretion and control of the animator.

For the system to process live audio, such as in the case of a user speaking to a microphone, phoneme recognition preferably includes an ability to process audio in real time, as it is sampled, with minimal latency. When processing pre-recorded audio files, it is possible to improve the quality of the phoneme recognition by looking ahead and processing larger chunks of data in each cycle.

Since drawing a character is performed at a fixed frame rate, which is not necessarily correlated to the length of audio events, more than one phoneme event could be detected by phoneme recognition 320 between every two frames. Therefore, a decision must be made regarding which phoneme to present at every frame. Filtering phonemes generated by phoneme recognition 320, meaning screening less dominant or less significant phonemes and retaining others, is a preferred way to decide which phonemes are presented at every frame. Filtering phonemes at every frame is based on the dominance of a phoneme, that is, based on its relative duration. However, some phonemes are more important perceptually than others and thus they are not filtered. These phonemes include the labial consonants (/m/, /b/, and /p/), which result from the lips closing, and phonemes requiring narrow, rounded lip positions (/U/, /w/, /o/, and /O/). It is perceptually important to viewers that a correct lip position is displayed when these types of phonemes are encountered.

Gaze Generator

A particularly preferred embodiment of the present invention controls several properties related to the eyes. These properties include gaze direction (where the eyes are looking), blinking, and pupil dilation. The role of a gaze generator, described below, is to determine and control the gaze direction of the character at every instance.

Gaze direction in humans is mostly voluntary with some involuntary reflexes. The involuntary aspect of gazing is based on what is called the Vestibule Ocular Reflex (VOR). This is the muscular reflex that keeps our eyes fixed on a point in space while the body is in motion. Try the following: hold a finger straight in front of your face and rotate your head left to right while staring at your finger. Your eyes will remain completely still and focused. Now, with your head remaining fixed, move your finger left and right while keeping your gaze fixed on your finger. You may not notice it, but as your eyes follow your finger, they jump through a series of static, non-continuous moves. This is called a gaze saccade, and it is the result of the VOR. A gaze saccade is involuntary and it is driven by a variety of physiological factors, most notably a level of intoxication.

More intriguing, though, are voluntary aspects of gaze direction. There are current research efforts to document aspects of gaze direction and duration in verbal and non-verbal aspects of conversation and expression. As discussed below, changing gaze direction is physiologically linked to blinking, and the assertion is made that these events are correlated. There are many rules that can be made from observations, though it should be noted that gaze direction is voluntary and learned and is therefore extremely subjective.

In simulating gaze direction in the present embodiment, the assumption is made that at any given moment there is a single preferred point in space at which the character will look. This is called a primary point of interest. In addition, it is assumed that while a character may continue to maintain the same primary point of interest for a considerable length of time, it will look away from time to time, for a variety of reasons, to what is called a tertiary point of interest. Furthermore, while a change in gaze direction has occurred, the primary point of interest has remained the same, and thus the eyes will naturally return to the primary point of interest in some amount of time. Switching between primary and tertiary points of interest during conversation is what some researchers call gaze cut-off. The location of the primary point of interest is determined by external events such as user input and the primary point of interest is defaulted to looking straight ahead.

The timing and patterns involved in gaze direction are elements that can be generalized into complex sets of rules. Unfortunately, rules vary widely between population segments. An attempt has been made to assemble rules that are simple enough not to be observed as incorrect or strange. The concept is to imply perceived normal human behavior. The following discussion outlines a process used to recreate believable eye behavior in real time with audio processing.

Figure 5:
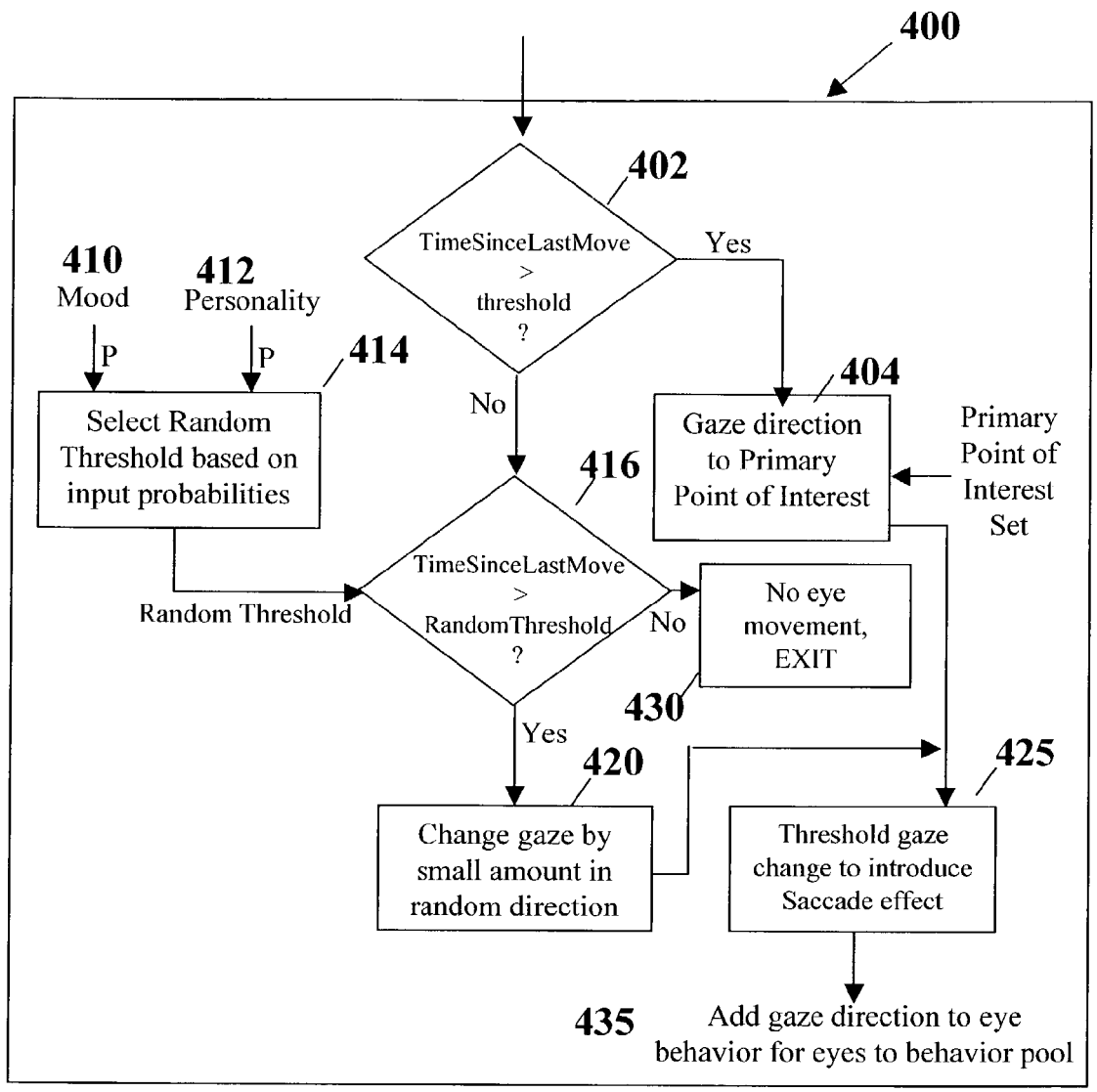
FIG. 5 is a simplified flowchart of a gaze generation process, in accordance with a third preferred embodiment of the present invention.

Reference is now made to FIG. 5, which is a simplified flowchart of a gaze generation process, in accordance with a third preferred embodiment of the present invention. FIG. 5 shows how random eye movement around a primary point of interest is determined at every frame, based on a set of thresholds and probabilities. A gaze generation process 400 is shown, beginning with a check of the time since the eyes have last been fixed on the primary point of interest. This is indicated as time since last move 402. If the time exceeds a high threshold value, then a call is made to consider setting the gaze direction to the primary point of interest 404 (which was previously set by user inputs.) If the time does not exceed the high threshold, then a random movement is considered and control proceeds to the next test for gaze movement, to be described below. Probabilities for eye movement based on mood 410 and personality 412 serve as input to random threshold generation 414. A random threshold is generated and it is then inputted to a test of the time since the last eye movement versus the random threshold 416. If the time exceeds the random threshold, then a gaze change is effected. A change in gaze is generated 420, based on another random value to determine whether the eyes move left, right, up, down, or back to the primary point of interest. If the time does not pass the random threshold, no eye movement is made and control is exited 430 for the current frame. Gaze generation 400 is subsequently evaluated at the next frame.

An example of including the probability input for personality 412 for random threshold generation 414 is that of a nervous character. A nervous character input for personality 412 would yield a lower random threshold, inferring a higher frequency of eye movement.

In the case of positive change of gaze, which in the current figure is either the output of the change in gaze 420 "yes" or the previously noted gaze direction back to the primary point of interest 404, either value of gaze change is added to a previous accumulated gaze change value. Thresholding of the accumulated gaze change value is performed to simulate gaze saccade effect 425 (or VOR) and to determine an actual eye movement. Actual eye movement is effected when the accumulated gaze change value exceeds the saccade threshold, which is preferably set to 3 degrees up/down and 7 degrees in left/right. If the accumulated gaze change value exceeds the saccade effect threshold, a final calculated gaze direction is set as the accumulated eye movement and the accumulated gaze change value is set to zero, for the next frame. If the accumulated gaze change value is less than the saccade effect threshold, a final calculated gaze direction is set to zero and the accumulated gaze change value is retained for the next frame. The final calculated gaze direction is added to the active behavior pool 435 as part of the orientation behavior element for eye behavior.

Blink Generator

The role of the blink generator is to yield naturally appearing character blinking by adding blink behaviors to the active behavior pool at appropriate times.

Blinking is an involuntary function that has interesting interactions with other concurrent activities. In humans, an average duration of a blink is 250 milliseconds, while an average number of blinks per minute is 20. It is interesting to note that if this data is assumed to be a constant, it can be said that we blink during 8% of our waking life. However, blinking rate is known to vary. Blinking is influenced by the need for the eyeball to moisten itself. It is for that reason that we tend to blink in tandem with eye movement. It has been shown that eye movement will trigger a blink event, and that a blink will trigger a move event. In addition, an increased heart rate correlates to a faster blink rate.

In conversation, we tend to blink upon vowel utterances. In particular, we will blink on the first vowel in a word. We also tend to blink on speech pauses greater than 150 milliseconds. These are involuntary responses to voluntary actions.

Figure 6:
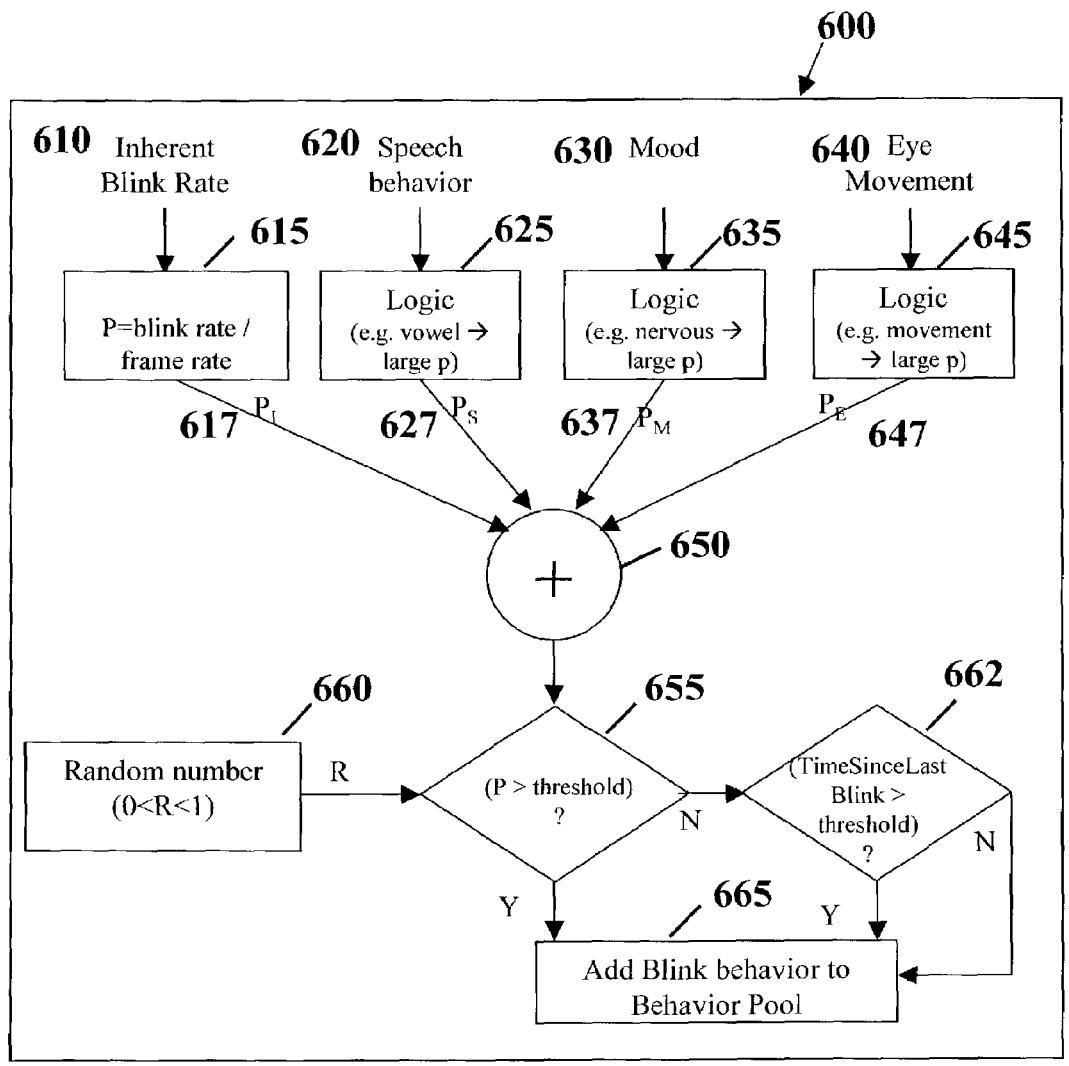
FIG. 6 is a simplified flowchart of blink generation process, in accordance with a fourth preferred embodiment of the present invention.

Reference is now made to FIG. 6 which is a simplified flowchart of blink generation, in accordance with a fourth preferred embodiment of the present invention. Blink generation 600 is implemented as a summed random event generator where the probability for an event is controlled by the current state and various character behaviors. An inherent blink rate 610 is inputted and is transformed 615 into a probability $P_I$ 617. Speech behavior 620 is transformed 625 into a speech-related blink probability output $P_S$ 627. The character's mood 630 (which is further discussed below) is transformed 635 into a mood-related blink probability output $P_M$ 637. In a similar fashion, eye movement 620 is transformed 640 to an eye movement related blink probability output $P_E$ 647. Respective transformations 615, 625, 635, and 645 are further described below. All of the previously noted probabilities, namely $P_I$ 617, $P_S$ 627, $P_M$ 637, and $P_E$ 647 are summed 650 to yield a current blink probability (between 0 and 1), which is then thresholded 655. For this purpose, a threshold is generated 660, yielding a random number with a value between 0 and 1. If the current blink probability is equal to or higher than the random number threshold, then a blink is triggered (i.e. "yes"). If no blink is triggered, the time since last blink versus the current clock 662 is thresholded against a maximum-permitted elapsed-time since last blink value. If the time since last blink exceeds the maximum-permitted elapsed-time since last blink value, then a blink is triggered (ie "yes"). Output from the respective thresholds 655 and 662, "yes" or "no", is used to decide whether the blink is to be added to the blink behavior in the active behavior pool 665.

An animator, responsible for ultimate subjective aspects of an animated character, defines the inherent blink rate 610 of a character as part of the character's personality. For example, a nervous character may be assigned a high blink rate, whereas a relaxed character would be assigned a lower rate. The blink rate is directly translated into a probability for a blink every time blink generation 600 is performed. For example, if a blink generation 600 is performed every second and the blink rate is set to 20 times a minute, then the probability for a blink would be set to 20/60=⅓. As noted, the blink probability value is summed along with other probabilities including: speech behavior 620 (e.g. vowels); moods 625 (e.g. nervous); and eye movement 640. Blink probability generation (such as 615, 625, 635, and 645 in the current figure) converts behaviors into respective blink probabilities. For example, a vowel event (triggered by the speech generator) results in an increased probability for a blink. Likewise an eye movement event (triggered by the gaze generator) results in an increased blink probability. A nervous mood contributes to a high probability for a blink, whereas a relaxed mood yields a lower blink probability. In addition to the above, and as previously noted, elapsed time since the last blink is tracked and if it passes a given threshold (preferably set to 4 seconds) a blink is triggered.

Exact values and ratios for the probabilities of each blink factor may change from character to character. Empirical tuning by the animator is required to achieve natural looking behavior for each character.

Head Orientation Generator

The role of a head orientation generator is to determine the orientation of a character's head at each frame. Head orientation parameters include turn, nod, and tilt. Head orientation is determined either directly by the user via user inputs or by character internal behaviors. Character internal behaviors may, in turn, be triggered by events or states of the character such as speech, idle, listening, etc. The way in which the various events and states influence a character's head position is defined completely by the animator.

Mood Generator

A mood generator sets the current character mood. Character mood, in turn, influences various other character behaviors (e.g. blink rate, facial appearance, etc). The mood generator may preferably select any linear combination of selected basic moods. In the present embodiment, eight such basic moods are included as follows: happy, sad, mad (angry), silly, surprised, scared, tired (bored), and "cool" (sexy). Basic mood selection is preferably flexible and is determined by the animator for every character. A list of eight moods is used only as an example and there is essentially no limit to the number of moods that may be used although mood input and determination is preferably appropriately controlled.

Figure 7:
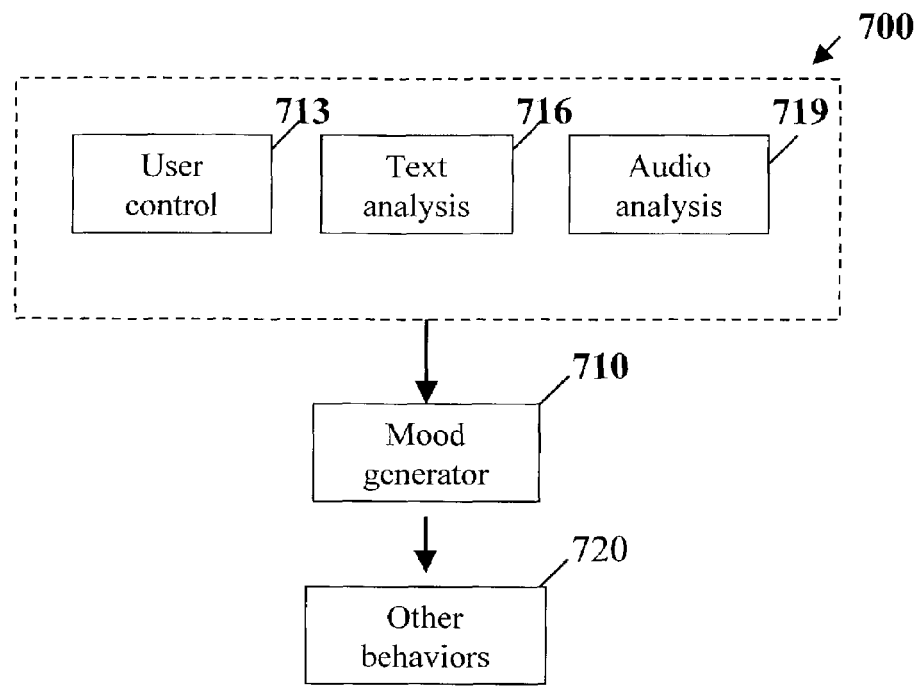
FIG. 7 is a simplified block diagram indicating how a mood generator is affected and how it affects other behaviors, in accordance with a fifth preferred embodiment of the present invention.

Reference is now made to FIG. 7 which is a simplified block diagram indicating the factors that can be used to influence mood generation, in accordance with a further preferred embodiment of the present invention. Inputs 700 to a mood generator 710 are indicated as either one or a combination of the following: user control 713 (such as by GUI or other direct inputs); text analysis 716 (based on characters, symbols, or text itself); and audio analysis 719 (based on tone, loudness, or speech itself). All three of these inputs are further discussed below. The mood generator 710 preferably sets the current character mood based on inputs 700 as noted above. Output of the mood generator 710 may be an array of parameters, which may in turn be used by other behavior generators 720.

A preferred embodiment of user control 713 comprises a graphical interface device in the form of a mood wheel, which is further described below. In text analysis 716, text entered by a user is analyzed for cues for the various moods. Cues may range from explicit symbols in the text, such as the popular emoticons common in electronic communication (e.g. ☺, ☻, etc.), to a more implicit reference to mood in the text (e.g. "I am bored"). More sophisticated analysis of the content and topic of text input may also be used to infer moods. An example is a character acting as a virtual news anchor, commentating about a collapse of the stock market. Text analysis of the content and topic of the commentary (ie the collapse of the stock market) yields a sad mood, and specific behaviors are then generated in the mood generator, as described above.

In audio analysis 719, input audio is analyzed for cues of various moods. Such cues include monitoring changes in voice characteristics such as amplitude, rate, and pitch. More sophisticated analysis may include recognition of the content of a spoken segment using voice recognition technology and then using cues in the interpreted audio as noted above in the case of text.

Figure 8:
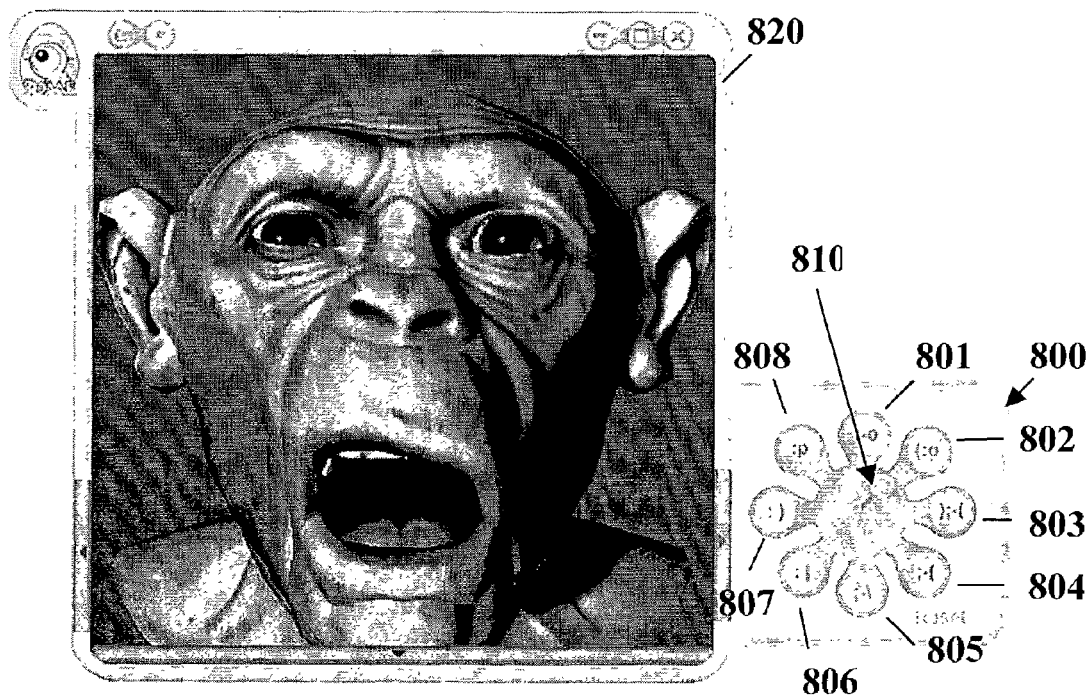
FIG. 8 is a simplified screen view showing a mood wheel and a sample character, in accordance with embodiments of the present invention.

Reference is now made to FIG. 8 which is a simplified screen view showing a mood wheel and a sample character, in accordance with embodiments of the present invention. As mentioned above, user control for input of mood may be achieved via a GUI device in the form of a mood wheel. The mood wheel is an interactive circular control device 800 with various moods indicated at points 801, 802, 803, 804, 805, 806, 807, and 808 around its circumference. A control dial 810 provided on the device 800 may both be rotated around the dial face to point directly at a given mood (801, 802, 803, 804, 805, 806, 807, and 808) or between adjoining moods, to indicate a combination of two adjoining moods. The control dial 810 may also be moved radially between the dial center and the outer circumference to indicate a relative intensity of a chosen mood or mood combination.

The control device 810 shows eight moods 801, 802, 803, 804, 805, 806, 807, and 808, as previously noted, but more or fewer moods may be used.

Scene Manager

A scene is composed of a background image and one or more characters. A preferred embodiment has only one character in the scene, so that the terms character and scene are used interchangeably. However, this need not be the case when more than one character is animated. As is traditionally the case in computer graphics and animation systems, a character is represented as a hierarchical tree structure. Each node of the tree (with a node usually corresponding to a body part) consists of a transformation matrix controlling relative scaling, translation, and orientation of the node and its geometric information. A hierarchical structure allows for relative motion so that, for example, eyes inherit the orientation of the head. In other words, if the head turns, the eyes turn with the head, in addition to possible movement of the eyes themselves within the eye sockets.

Behavior generators, as previously discussed in FIG. 2, produce behaviors which are maintained in the active behavior pool. The process of behavior production and maintenance take place continuously and asynchronously of a drawing cycle. The scene manager determines the state of the character for a current drawing cycle and creates a 3D scene, based on active behaviors in the active behavior pool. The scene manager then produces the current drawing cycle 3D scene, which includes geometry (positions of the character's polygon vertices), orientation of the various face and body parts, and appearance of each polygon (textures or color). A resulting 3D scene is then rendered to the display. The following discussion describes a mechanism for controlling various aspects of the scene, namely geometry (by way of geometric morphing), orientation (using rigid and "sticky" transformations), and appearance.

Geometric Morphing

Geometric morphing is the process of smoothly transforming scene geometry (i.e. 3D polygon vertex locations) from one state to another through an allotted time. Consider for example the case of animating a character smiling. An original state is a base state where the character has a neutral expression. A final or target state consists of a transformed scene so that the character has a full smile. To accomplish a smooth transition from the original state to the target state, positions of polygon vertices are linearly transformed over the frames displayed during the time defined for the smile, so that the character's facial expression will not change abruptly from one state to the next.

Let $v_i^k$, denote the position of a vertex i in target k. For a smooth transition from the base state (denoted as target 0) to state k, over T frames, for every frame t, between 0 and T. the position of the vertex is given by $$v_i(t) = \left(1 - \frac{wt}{T}\right)v_i^0 + \frac{wt}{T}v_i^k$$

where w is an optional weight factor.

In a preferred embodiment, a character may exhibit more than one behavior simultaneously (e.g. speaking and smiling). Therefore many targets may be active simultaneously. As a result, the position of a vertex at every frame is given by the linear combination of positions determined by the above formula for every target.

Orientation

Character orientation and subsequent orientation of each of its components (i.e. tree nodes, as noted above in the scene manager discussion) is controlled by applying a rotation transformation to all points of a given component. Two types of transformations, rigid and sticky, are discussed below, although additional transformations may also be applied. Rigid transformations apply uniformly to all vertices, such as in the case of eyeballs moving within the eye sockets. (Refer to any textbook on computer graphics for a discussion of rigid transformations.)

On the other hand, sticky transformations are used to simulate non-uniform motion due to tension of the skin and/or muscles. For example, when the head moves relative to the shoulders, points on the lower part of the neck closer to the shoulders remain stationary ("sticky") and points closer to the head move most completely. The discussion below describes the concept of sticky transformations and their implementation with a focus on orientation, since character head orientation is most relevant for the preferred embodiment., Translation and scaling are also applicable with sticky transformations and they can be applied by an animator if desired.

Sticky Transformations

In a machine constructed with joints, a joint generates rigid motion for an active side. In other words, the active side of the joint moves as one unit, and each point of the active side and joint goes through the same transformation. In contrast, a human body is covered with skin, and many muscles contribute to one motion. The only rigid (or typically nearly rigid) parts of the body are bones. To visualize a skin-covered character moving its head, for example, we need to apply a non-rigid transformation (or deformation) to vertices comprising polygons modeling the character's geometry.

A precise deformation of human skin upon head movement is not deterministic. Each person may have different deformation characteristics. More specifically, each person's head moving capabilities are different, as some of us are more flexible than others. For example, an Indian dancer can translate her head without rotating it, while an average person may have difficulty in performing this task.

The following discussion focuses on head rotations only for purposes of simplification. For most humans, there are three degrees of freedom for head rotation and they are denoted; turn (Y axis rotation); nod (X axis rotation); and tilt (Z axis rotation). Head orientation deformations below are defined according to these rotation axes. A basic assumption is that when a head rotates, all the character's vertices rotate around the same center of rotation. While an entire head performs a rigid rotation, individual vertices may differ in their angle of rotation, and a stickiness function for each vertex is defined to determine an individual vertex rotation angle.

For simplicity, assume that stickiness is a linear function for each rotation axis. That is, if the head turns $\alpha$ radians to the right, and some vertex v rotates $\theta_{v,\alpha}$ as a result, then for each $\alpha$, the expression:

$$\theta^{v,\alpha} = k_v \alpha$$

is valid, where $k_v$ is constant for each vertex v. $k_v$ is called the angular coefficient for v. Given information about the position of each vertex v in different head orientations, the goal is to compute a constant $k_v$ that will be later used for scene deformations resulting from head rotations.

Computing Angular Coefficients Between Known Position and a Pivot

Figure 9:
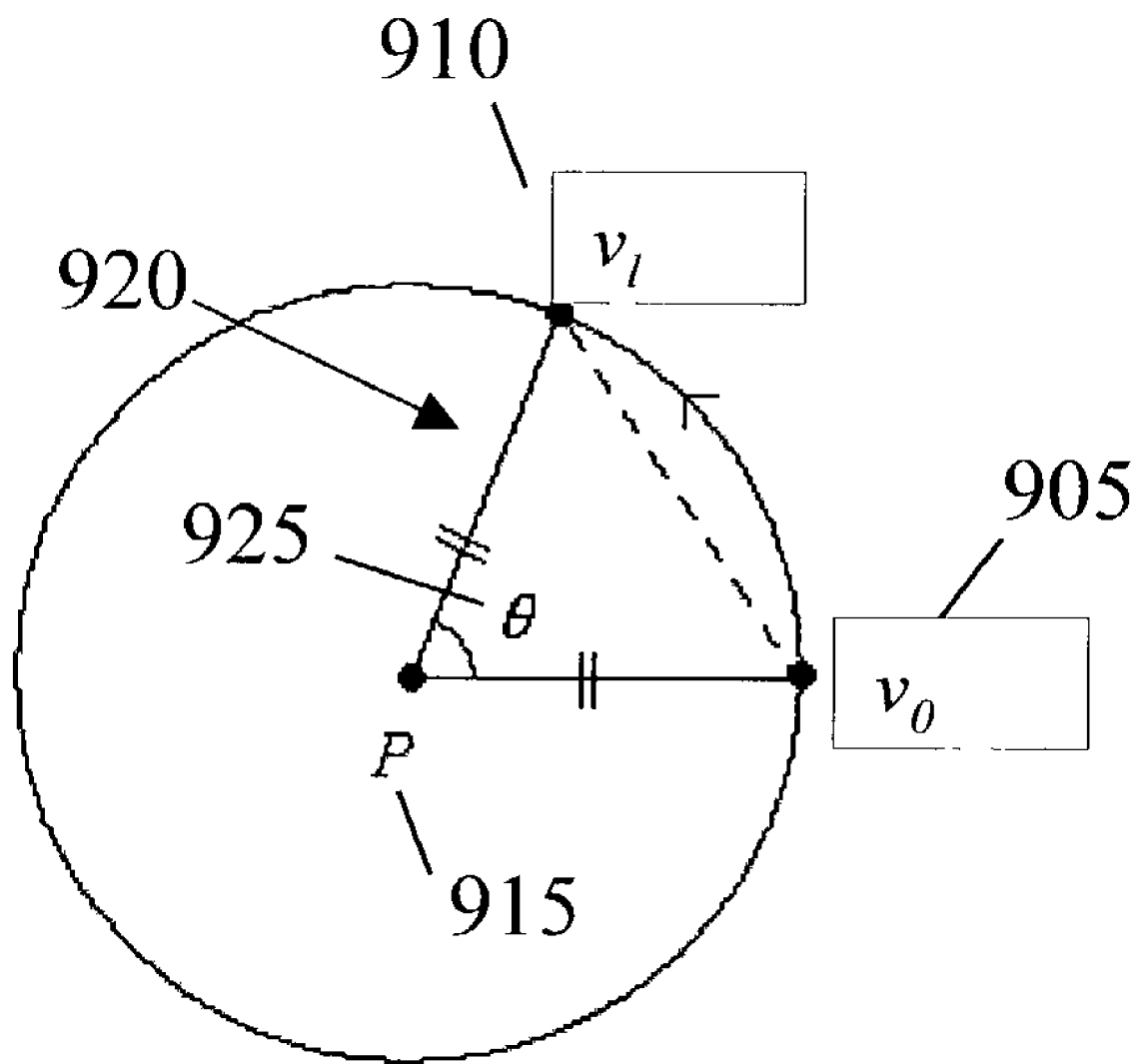
FIG. 9 is a simplified diagram showing a vertex rotation, in accordance with a sixth preferred embodiment of the present invention.

A method to compute the angular coefficient for a single vertex v, relative to one rotation axis is described below. Reference is now made to FIG. 9 which is a simplified diagram showing a vertex rotation, in accordance with a six preferred embodiment of the present invention. A rotation is shown from the initial position $v_0$ 905 to a final position $v_1$ 910 around a center of rotation (or pivot point) P 915. The triangle $\Delta v_0 P v_1$ 920 is isosceles ($\|v_0 P\|=\|v_1 P\|$) with head angle $\theta$ 925 (and side angles $(\pi-\theta)/2$). $\theta$ 925 is the angle between the vectors $\vec{u_0}=v_0-P$ and $\vec{u_1}=v_1-P$. To find $\theta$, use the formula:

$$\theta = ar\cos\frac{\vec{u_0} \cdot \vec{u_1}}{\|\vec{u_0}\| \cdot \|\vec{u_1}\|}$$

where • signifies for the dot-product of two vectors. A signed angle can be determined if the direction of the axis of rotation is known, and in this case the cross product of $\vec{u_0}$ and $\vec{u_1}$ (which is a vector perpendicular to both) is compared with the direction of the axis.

In the following discussion, "model" refers to a character that is manipulated and created mathematically, and "character" is that final image or group of images seen by the user. The animator creating a model creates a character looking to the left, right, up, down, and so on, for various rotation angles. It is assumed that the topology of the character is identical in all such positions, that is, every model vertex has exactly the same index and the same connectivity along all the targets.

It is desirable to use as much information as possible in developing and manipulating models to enhance their credibility to viewers. However, handling larger amounts of information typically infers larger computation complexity. As such, the following discussion deals with how multiple vertex rotations may be efficiently handled, in accordance with yet another preferred embodiment of the current invention. It is noted that the rotation is a sticky rotation and, in a sticky multiple vertex rotation the different vertices each have different levels of stickiness, thus for example in turning the head by a certain angle, the different vertebra descending downwardly in the neck, may be expected to turn but each by a successively smaller amount of the total rotation.

An angular coefficient $k_v$ may thus be defined for a vertex $v$ around one of the model axes, as the average (mean) ratio between a total rotation angle (e.g. the total head rotation) and an actual rotation angle for the individual vertex as computed from the equation $\theta_{v,\alpha}=k_v\alpha$ (as noted above). Referring to the equation $\theta_{v,\alpha}=k_v\alpha$, a value of $k_v=1$ infers a completely rigid motion around an axis (e.g. a vertex on the top of the head), whereas a value of $k_v=0$ indicates that a vertex remains fixed irrespective of the rotation is (e.g. low neck vertex). Values of $k_v$ such that $0<k_v<1$ are indicative of partial rotation (e.g. neck vertex). (Theoretically, $k_v<0$ means a rotation opposite the direction of rotation, and $k_v>1$ means accelerated rotation. These values are mathematically supported by the preferred embodiment.)

Efficient Implementation of Sticky Rotation

Rigid rotations affect all the vertices of a node whilst subject to the rendering process, as long as an active transformation matrix is fixed. Standard graphics libraries (e.g. OpenGL) enable a user to define the current transformation matrix once and then render polygons or triangles efficiently using the same matrix. In the preferred embodiment, vertices of polygons are not equally transformed, and a different method is taken, as described below.

Assume a triad of Euler angles $(\alpha_x, \alpha_y, \alpha_z)$ is obtained as a desired orientation. Initially, it would appear as if a new rotation matrix for each vertex must be computed, as the angular coefficients are different for each vertex. Yet a few optimizations can generate a much faster rendering.

First, a map of the model vertices sorted by angular coefficients may be stored. A map of sets is used, where a key is the angular coefficient, and a value is a set of vertex indices having that coefficient. Rotation matrices need only be created per key, but vertices will still have to be rotated in software.

A second optimization is to define a value of stickiness for a vertex ($s_v$), rather than an angular coefficient for a vertex ($k_v$). Whereas the angular coefficient describes how much a vertex moves relative to the global motion, stickiness describes how much the vertex stays stationary and it is defined as:

$$s_v = 1 - k_v$$

At this point graphics library rotation mechanisms may be used according to the following steps:

1. Sort the model vertices by their stickiness so that values with stickiness=0 may be segregated.
2. Given a rotation angle $\alpha$ around an axis W:
   i. Define a local rotation of $\alpha$ around W using standard library commands.
   ii. For all vertices with stickiness 0, make no changes.
   iii. For each stickiness $s_i$, compute a rigid rotation matrix with angle $-s_i\alpha$.
   iv. Multiply each vertex that has the stickiness $s_i$ by the rigid rotation matrix. This generates a backwards or negative rotation over the current local rotation from step (a) above.

This solution is efficient because it uses a standard graphics library rotation, which may be optimized by hardware. This solution also enables a scene node, typically a body part, to control its descendant's local transformations in a simple manner, that is, in a manner resembling a standard rotation. The method described above essentially makes a sticky rotation a special case of standard rigid rotation, and requires less software overhead.

Appearance

In addition to geometric morphing and transformations, which are mechanisms for controlling model geometry as defined by the position of vertices, the appearance of an object may be controlled by controlling its color and texture—as previously noted.

In another preferred embodiment, each polygon of the model has an associated material. The material defines visual attributes of the polygon. These attributes include its diffuse, specular, ambient, and emissive colors, as supported by an available rendering library. If the polygon is textured, the material will indicate a relevant texture. To support texturing, each polygon vertex has texture coordinates (otherwise known as uv coordinates) which map between the vertex and its position in a texture map.

Various effects may be created by modifying materials during an animation sequence. As one example, causing the character to blush may be performed by modifying colors or texture accordingly.

Lighting is another controlled aspect of character animation in the present embodiment. The number and position of lights dramatically affects the character appearance. Lighting is determined by the animator, within the limits of the support of the hardware device running the application.

Rendering

Rendering of a 3D scene into a 2D display is performed using standard graphics libraries, such as OpenGL or DirectX. Libraries such as these make use of graphics acceleration hardware, if such exists on the hardware device. As noted in the previous discussion on appearance, a user and an animator creating the character may also control all rendering attributes, such as lighting, textures, background, and camera position.

To avoid flickering, rendering is preferably performed in a double buffer mode where rendering is actually done into a buffer, which is not visible to the user. Once rendering is complete, buffers are swapped and a new rendered image becomes visible to the user.

Making a Character—Examples

The following discussion provides an overview of requirements to produce a functioning animated character, in accordance with embodiments of the present invention. A character's polygonal meshes and textures are created within standard applications such as Maya, SoftImage, 3D Studio Max, or Mirai. Character models are brought to life by morphing between various displacements of the basic models, as discussed previously.

There are five basic categories of displacement data that are created: (1) visemes for phonetic events; (2) face muscles for involuntary and automatic behaviors; (3) moods for behaviors; (4) head rotations; and (5) eye direction related for eye movement.

The example audio processing library has 40 preferable phonemes. A duration of a phoneme varies from 30 to 300 milliseconds. An animator preferably makes an entry for each phoneme. This does not mean that the animator makes 40 individual displacements; rather the animator may use the same displacement for groups of phonemes that are similar. That is because similar phonemes yield the same visual result (i.e. visemes).

Reference is now made to the table below which shows preferable phoneme groupings for animated characters according to yet another embodiment of the present invention.

| 3D Label | Phone Label | Description |
|---|---|---|
| bump | B 100<br>m 100<br>p 95<br>b 100 | Lips closed |
| fave | F 100<br>v 90 | Bottom lip under top teeth |
| size | Z 100<br>z 90<br>s 80 | Rounded fricative |
| church | J 100<br>j 90<br>S 80 | Rounded fricative |
| though | T 100<br>D 90<br>170 | Tongue on top teeth |
| though<br>but could<br>be told | d 70<br>G 70<br>t 70<br>k 70 | Dental consonant |
| new | N 100<br>n 60 | Velar consonant |
| if | ! 100<br>^ 100<br>e 80<br>i 60 | Neutral vowel |
| eat | A 100<br>I 100<br>a 80<br>H 70<br>W 70 | Front high vowel |
| cage | E 100<br>y 80 | Front mid vowel |
| oat | O 100<br>o 80<br>U 60 | Narrow rounded vowel |
| wet | w 100 | Narrow rounded vowel |
| roar | R 100<br>u 80<br>r 50 | Rounded vowel |
| ox | c 100<br>C 90 | Wide rounded back vowel |

"3d Label" in the table above is the simple term used to describe a viseme. Saying the word indicated in the 3d Label column gives the animator an idea of what the viseme looks like, in terms of a character's facial appearance. "Phone Label" is the label for an actual phoneme event, indicated by a letter such as m, D, and A, for example. The number next to the Phone Label is relative weighting used to blend a viseme in conjunction with the energy reported by the phoneme recognition model 320. The last column, designated "Description", indicates the proper linguistic description of a group of phonemes. Groups of phonemes are indicated by bolded boxes. Each group represents phonemes that are so similar that they could be combined into a single viseme if desired. Note that grouping indicated above is only a guideline. Different characters may warrant varying levels of complexity with regard to phoneme-to-viseme transformations.

Each of the following facial muscle behaviors is preferably integrated as individual displacements for left and right side of the face: brow raise/frontalis inner; brow lower (frown)/frontalis major; brow lower (sad)/frontalis minor; nose scrunch/labii nasi superior; eye blink; eye wink; eye squint; lips smile/zygomatic; lips sneer/labii nasi minor; lips grown/angular depressor; and lips pout mentalis; and lips open/risorius.

Eight basic emotion types are preferably used. The animator may make as many or as few displacements within each category as desired: silly; scared; surprised; mad; sad; sleepy; cool; happy; and head rotations.

To support a sticky rotation of the head as previously discussed, an animator makes at least one displacement for each extreme in each axis of rotation. Therefore, to support head rotations, the animator makes a minimum of six rotation displacements, two for each axis, and one in each extreme direction. Rotations all are made around a node's local origin. The animator supplies a transform to move the node to its desired location. The degree of the rotation chosen only needs to be accurate; its value is left to the animator's discretion. So, for example, if the animator makes a rotation of 15 degrees, the rotation should be as close to 15 degrees as possible. Automatic stickiness calculation use rotations with an amount specified by the animator, and the amount that the animator is not accurate adversely affects runtime sticky rotations. The animator may create as many rotations on an axis as he prefers. Multiple axis rotations help the stickiness calculations to be more correct.

Eye Direction

To support a best possible animation of eyes, the animator may create displacements related to a direction in which the character's eyes are looking. Displacements may be used to make soft tissue around the eyes change to reflect the direction in which eyes are looking. Alternatively, the animator may set displacements on eyes themselves to trigger displacements when eyes are looking in a certain direction. For example, the animator may have the character's eyes squash when they look in a certain direction. Note that for simple characters, the animator may completely ignore this feature, and a character will function satisfactorily. The present embodiment preferably supports as many directions as the animator wants, and directions are placed evenly around a 360-degree distribution. Four or eight directions are recommended.

Applications

There are many applications of the present embodiments in a wide array of interactions between humans and a computer. The following discussion outlines a small sample of possible applications.

Sending Animated Messages to Internet Users

A user may record an animated message and send it to a friend's email address. For example, John could choose a character and compose a birthday greeting by animating the character speaking a personal message to Mary such as "Happy Birthday Mary". John may type the text to be spoken by a text to speech engine, or he may actually speak the text himself; thus the character will speak with John's voice. John may puppeteer the character to perform certain acts or expressions, such as a kiss. Finally, John may send the resulting animation to Mary's email account using one of several standard video formats or 3dME's proprietary format.

Sending Animated Messages to Mobile Devices

The current application is similar to the application described above, only a message is sent to a mobile device (e.g. cellular phone). This is typically performed using the Multimedia Messaging Service (MMS) standard. After the message is composed, it is converted to the MMS standard and sent via the MMS center to a recipient's mobile device. Details and protocols of this process are detailed in the MMS standard documentation.

Instant Messaging Client

Animated characters may be used as a front end for instant messaging (chat) services. These services may include software such as ICQ, AOL Messenger or Microsoft Messenger, or a 3dME proprietary service. Each user taking part in a chat chooses a character. The other parties see and hear the chosen character relating everything spoken or typed by the first user. This application could be thought of as virtual video conferencing where users see animated stand-ins of one another. In fact, in this application and others above, one or more specific animated characters could be chosen to represent a person when communicating with others. Note that this application is possible for both fixed and mobile users and devices.

Agents

A 3dMe character is connected to a knowledge base of some kind. A user may then query a character for information on a specified topic and an agent will interpret the question and speak the answer. As an example, consider a character modeled after a well-known basketball player responding to users' questions about the NBA such as "who was the most valuable player in the 1997 Championship."

Agents are available in two major flavors: pull and push. Pull agents are driven by the user's direct queries as in the example above. Push agents are driven by the server to the user. As an example, consider a fortune telling service which sends a fortune teller character with a message of the daily horoscope to subscribing users.

Virtual DJs

Another application is similar to the agent application discussed above, where the expertise of the agent is in a certain music category. A character may present music to computer and mobile phone users as a real DJ would. The character may even sing along. The current application could be part of the many Internet radio services or music players such as Win Amp, Real Player, or Microsoft Windows Media Player.

Direct Marketing and Sales

Companies may make use of the current application to drive promotion and marketing information to their potential customers. An example is an airline sending a message with a pilot character promoting discount last minute tickets to registered users. The fun and entertaining quality of characters may provide advantages beyond conventional advertising techniques. The ability to personalize messages per user allows for low cost effective direct marketing.

General

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

The invention claimed is:

1. An apparatus comprising a computer processor for animating a moving and speaking enhanced-believability character in real time, comprising:
   i. a plurality of behavior generators each responsible for a respective aspect of facial behavior, at least some of said generators being configured with a respective time definer defining time intervals and generating behavior elements in accordance with said defined time intervals;
   ii. a unifying scripter, associated with said behavior generators, said unifying scripter operable to combine said generated elements into a unified animation script for said enhanced believability character; and
   iii. a renderer, associated with said unifying scripter, said renderer operable to render said enhanced believability character in accordance with said unified animation script,
   iv. an executor, associated with said renderer, operable to execute animating of said rendered enhanced believability character,
   wherein said behavior generators are configured to continue to generate behavior elements during execution of said animating of said rendered enhanced believability character in accordance with said defined time intervals and said renderer continues to render the enhanced believability character in accordance with respective ones of said generated behavior elements as said behavior elements are added to said unified animation script during said execution of the animating of the rendered enhanced believability character, said unifying scripter randomly selecting elements from different ones of said behavior generators in response to stimuli for addition to said unified animation script.

2. The apparatus according to claim 1 wherein said behavior generator is operable to generate an element of said aspect over a defined time.

3. The apparatus according to claim 2 wherein said aspect comprises a plurality of currently selected ones of said behavior elements.

4. The apparatus according to claim 1 wherein said aspect is maintainable through an active behavior pool of said behavior elements in accordance with said defined time.

5. The apparatus according to claim 1 wherein said behavior elements of said aspect comprise at least one chosen from a list comprising: geometric; orientation; and appearance elements.

6. The apparatus according to claim 5 wherein said geometric behavior element comprises changes of position of a plurality of vertices of said polygonal surfaces.

7. The apparatus according to claim 5 wherein said orientation behavior element comprises changes to said character resulting from transformations to vertices of said polygonal surfaces.

8. The apparatus according to claim 7 wherein said transformations comprise a rigid transformation applied to a plurality of vertices of said polygonal surfaces of at least one part of said character.

9. The apparatus according to claim 7 wherein said transformations comprise tapered transformations operable upon a plurality of points of said character in accordance with respective stickiness factors.

10. The apparatus according to claim 9 wherein respective stickiness factors are defined as: $s_\nu = 1 - k_\nu$ where: $s_\nu$ is said stickiness factor for a rotation of a given vertex within a body of vertices; and $k_\nu$ is an angular coefficient for said vertex, $k_\nu$ further being defined in: $\theta_{\nu,\alpha} = k_\nu \cdot \alpha$, where: a is a rotation of said body of vertices; and $\theta_{\nu,\alpha}$ is a resultant rotation at said vertex.

11. The apparatus according to claim 10 further comprising a graphics library rotation mechanism to effect a sticky rotation, resembling a standard rigid rotation, said mechanism comprising: i. a sorter for sorting said vertices according to respective $s_\nu$ values; ii. a rotation definer for defining a local rotation, based upon said rotation angle a around an axis W, using library commands; iii. a rotation matrix computer, in association with said sorter and said rotation definer, operable to compute a rigid rotation matrix with angle $-s_\nu a$ for said vertices when $s_\nu$ is not equal to zero. iv. a vertex multiplier, in association with said thresholder, for multiplying respective vertices with a non-zero $s_\nu$ value by said rigid rotation matrix, thereby yielding a negative rotation over said angle a.

12. The apparatus according to claim 1 wherein said behavior elements of said aspect are operable upon a plurality of polygonal surfaces comprising a visual appearance of said character.

13. An apparatus according to claim 1, wherein said renderer is configured to render said character on a frame-by-frame basis.

14. A computerized method for animating a moving and speaking enhanced-believability character in real time, comprising carrying out on an electronic computer:
   i. defining a plurality of aspects of behavior;
   ii. for at least some of said aspects, dynamically determining time intervals and providing respective behavior elements in accordance with said time intervals;
   iii. receiving said respectively provided behavior elements;
   iv. unifying said received elements into a unified animation script;
   v. rendering said character in accordance with said unified animation script; and
   vi. animating said character using said rendering, thereby dynamically integrating said respective provided behavior elements in accordance with said time intervals to enhance believability of said rendered character, said unifying said received elements into said unified animation script comprising randomly selecting elements from different ones of said behavior aspects in response to stimuli, the unified animation script being for controlling said electronic computer to carry out said animating.

15. The method according to claim 14 further comprising defining said plurality of aspects substantially off line.

16. The method according to claim 14, further comprising generating said respective elements for a respective defined time.

17. The method according to claim 14 wherein rendering said character comprises rendering on a frame-by-frame basis.

18. An apparatus comprising a computer processor for animating a moving and speaking enhanced-believability character in real time, comprising:
   i. a plurality of behavior generators each responsible for a respective aspect of facial behavior, each generator being configured to generate behavior elements and to provide ones of said elements relating to said aspect, said ones of said elements being provided at random;
   ii. a unifying scripter, associated with said behavior generators, said unifying scripter operable to combine said generated and randomly provided elements into a unified animation script for said enhanced believability character; and
   iii. a renderer, associated with said unifying scripter, said renderer operable to render said enhanced believability character in accordance with said unified animation script,
   iv. an executor, associated with said renderer, operable to execute animating of said rendered enhanced believability character,
   wherein said behavior generators are configured to continue to generate behavior elements during execution of said animating of said rendered enhanced believability character and said renderer continues to render the enhanced believability character in accordance with said randomly selected ones of said generated behavior elements as said behavior elements are added to said unified animation script during said execution of the animating of the rendered enhanced believability character, said unifying scripter randomly selecting elements from different ones of said behavior generators in response to stimuli for addition to said unified animation script.

* * * * *